(12) United States Patent
Kuwabara et al.

(10) Patent No.: US 6,581,907 B1
(45) Date of Patent: Jun. 24, 2003

(54) PIPE COUPLING

(75) Inventors: Tetsuya Kuwabara, Tokyo (JP); Naoyuki Kotake, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 09/615,560

(22) Filed: Jul. 13, 2000

(51) Int. Cl.[7] ............................................. F16L 37/28
(52) U.S. Cl. ................................... 251/149.6; 285/314
(58) Field of Search ....................... 251/149.6; 285/313, 285/314

(56) References Cited

U.S. PATENT DOCUMENTS

| | | | |
|---|---|---|---|
| 3,176,717 A | | 4/1965 | Ogne |
| 3,781,039 A | * | 12/1973 | Locke et al. ................... 285/1 |
| 5,056,560 A | | 10/1991 | DeMartelaere |

FOREIGN PATENT DOCUMENTS

| | | |
|---|---|---|
| EP | 0 926 422 A2 | 6/1999 |
| FR | 2 786 848 | 6/2000 |

* cited by examiner

*Primary Examiner*—John Fox
(74) *Attorney, Agent, or Firm*—Pennie & Edmonds LLP

(57) ABSTRACT

A pipe coupling comprises a socket and a plug having front end portions engagable with each other. This socket comprises a plurality of lock balls movable to lock positions where the lock balls partially project into an axial bore of the socket body, and a sleeve for holding the lock balls at the lock position. The socket body has a plurality of engage holes elongated in the axial direction. The sleeve is rotatable on the socket body and has a press portion for pressing the lock balls toward the lock positions, a press release recessed portion circumferentially is adjacent to the press portion for retracting the lock balls from the lock positions, and a large diameter portion. The pipe coupling further comprises sleeve-rotation-restricting convex and recessed portions which restrict the rotation of the sleeve relative to the socket body, to an angle range between a press position where the press portions oppose the lock balls and a release position where the press release recessed portions opposed to the lock balls, a collar movable in the large diameter portion, and a spring for urging the sleeve toward the press position and the collar toward the front end.

9 Claims, 7 Drawing Sheets

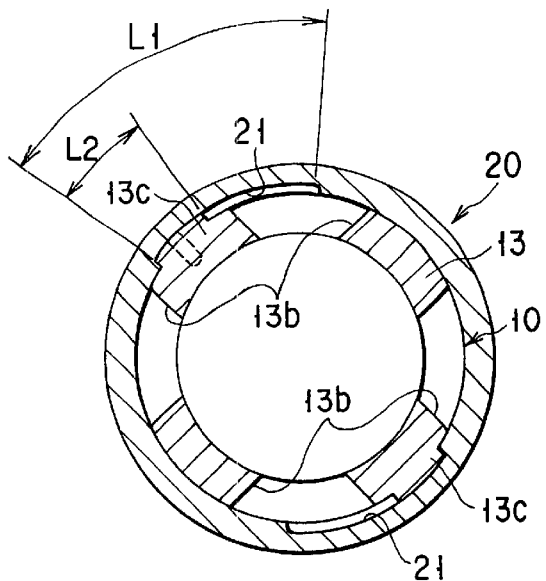 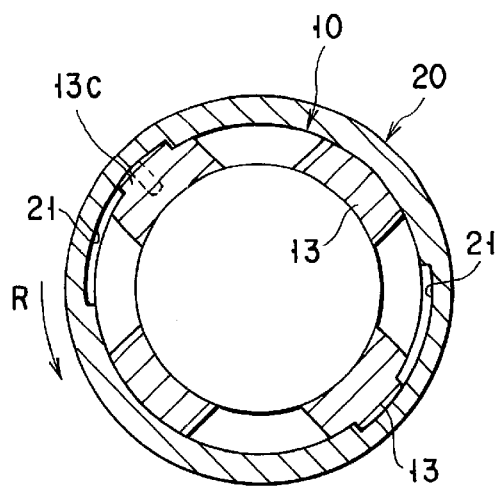
FIG. 7A  FIG. 7B
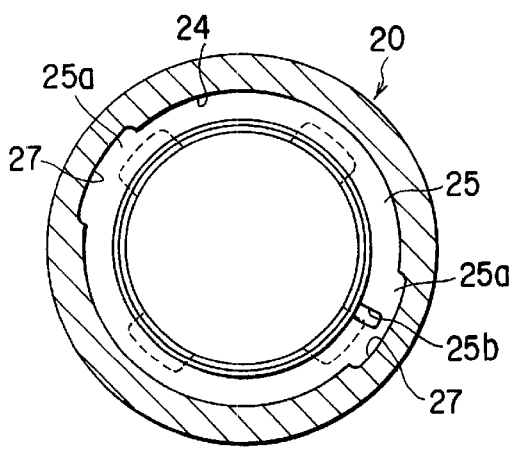 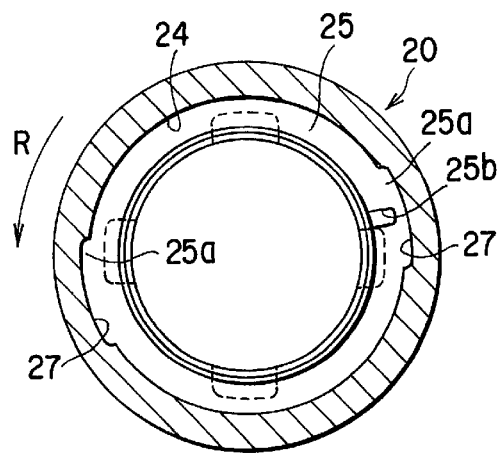
FIG. 8A  FIG. 8B

PIPE COUPLING

BACKGROUND OF THE INVENTION

The present invention relates to a pipe coupling for streaming various fluids.

A conventional pipe coupling comprises a socket and a plug which can be detachably connected by lock balls, and a sleeve which is axially slidable on the outer circumference of the socket. In this case, in a plugged-in state where the socket and a plug are connected with each other, the sleeve is at a forward-shifted position and prevents the lock balls from moving radially outwardly to lock the plug. To disconnect the plug in locked state, the sleeve is pulled backward so that the lock balls are released.

In this conventional pipe coupling using a slidable sleeve, unintended disconnection of the plug must be securely prevented.

Also, there may arise a problem that the pipe coupling cannot be utilized at a place where it is difficult or impossible to slide the sleeve in the (backward) direction due to limitations of installation space and work space.

BRIEF SUMMARY OF THE INVENTION

Therefore, it is an object of the present invention to provide a pipe coupling which securely prevents unexpected disconnection of the plug and which has excellent operability even though installation space or work space is limited.

According to the present invention, there is provided a pipe coupling including a socket and a plug which respectively have front end portions which can be engaged with each other, and rear end portions connected with pipes. The socket comprises a socket body having an open end where an axial bore for receiving the plug is opened, at least one lock ball which can be moved between a lock position where the lock ball partially projects into the axial bore and an unlock position where the lock ball is retracted thereby making the plug movable in the axial-direction, and a sleeve slidably mounted on the socket body and capable of holding the lock ball at the lock position. The plug has a groove with which the lock ball can be engaged. The socket body has a front end portion close to the open end, and a lock ball engage hole which is formed at the front end portion, contains the lock ball movably in an axial direction and a radial direction, can be retracted from the lock position where the lock ball partially projects into the axial bore, and is elongated in the axial direction. The sleeve is mounted on the outer circumference of the socket body to be rotatable about an axis thereof, and has an inner circumferential surface, a press portion which is formed on the inner circumferential surface and presses the lock ball located at a position close to the open end in the lock ball engage hole toward the lock position, a press release recessed portion capable of retracting the lock ball to the unlock position, and a large diameter portion arranged axially adjacent to the press portion and the press release recessed portion and capable of retracting the lock ball located at a position distant from the open end to the unlock position. The pipe coupling further comprises a sleeve rotation restricting mechanism for restricting a rotation of the sleeve to an angular range between a press position where the press portion opposes the lock ball and a press release position where the press release recessed portion opposes to the lock ball, a collar movably contained in the large diameter portion, and a spring for urging the sleeve toward the press position and for urging the collar toward the open end.

According to the pipe coupling described above, the plug can be engaged in the socket only by inserting the plug into the axial bore from the open end of the socket body. Further, the plug can be separated from the socket only by rotating the sleeve on the socket body about the axis thereof. Accordingly, the sleeve can be operated even in a very narrow space for making easy disconnection. Further, even if an impact force in the axial direction acts on the sleeve, the fitting engagement between the plug and the socket is securely maintained, and the plug is not unexpectedly separated from the socket.

Preferably, the sleeve rotation restricting mechanism has a rotation restricting recessed portion circumferentially extended on one of the outer circumference of the socket body and the inner circumferential surface of the sleeve, and a rotation restricting projecting portion formed on another one, having a length shorter in a circumferential direction than the rotation restricting recessed portion, and projecting into the rotation restricting recessed portion.

Also preferably, the collar and the sleeve have at least one groove formed in one of the collar and the sleeve, as well as a projection formed on the other of the collar and the sleeve, the projection being slidable in the groove only in the axial direction, and the spring is contained in the large diameter portion and has a coil-like shape having an end engaged on the socket body and another end engaged on the collar.

According to a preferred embodiment of the pipe coupling, the pipe coupling further comprises a plurality of projecting portions provided on one of the socket body and the sleeve, and a plurality of recessed portions provided on the other of the socket body and the sleeve and capable of receiving the projecting portions along the axial direction, wherein relative rotation between the socket body and the sleeve is prevented when the plurality of projecting portions are engaged with the plurality of recessed portions, and the relative rotation is allowed when the plurality of projecting portions are contained in a circumferential recessed portion.

In this pipe coupling, to separate the plug from the socket, the sleeve is pulled toward the rear end in a first step, so that the plurality of projecting portions are released from engagement with the plurality of recessed portions and are positioned in the circumferential recessed portion. Thereafter, in a second step, the plurality of projecting portions are guided in the circumferential recessed portion, thereby enabling rotation of the sleeve. Accordingly, only when the movements in two different directions are combined, the plug can be separated from the socket, so that the reliability of engagement is increased and the safety thereof is also improved.

According to another preferred embodiment of the pipe couple, the pipe coupling further comprises a protection cylinder which covers the sleeve and is rotatable, wherein the protection cylinder has a cylindrical wall which is made of a flexible material and creates a clearance from the outer circumferential surface of the sleeve, and rotation of the protection cylinder can be transmitted to the sleeve as an operator press the cylindrical wall into contact with the sleeve.

In case of this pipe coupling, as long as the operator does not press or operate the protection cylinder, the sleeve cannot rotate. Therefore, unexpected disconnection of the plug is prevented securely so that the safety is more improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A and 7B are respectively a longitudinal cross-sectional view, taken along line 7A in FIG. 4 showing a locked state and a longitudinal cross-sectional view, taken along line 7B in FIG. 5 showing an unlocked state.

FIGS. 8A and 8B are respectively a longitudinal cross-sectional view, taken along line 8A in FIG. 4 showing a locked state and a longitudinal cross-sectional view, taken along line 8B in FIG. 5 showing an unlocked state.

DETAILED DESCRIPTION OF THE INVENTION

In the following, three embodiments of the pipe coupling according to the present invention will be explained with reference to the drawings.

Figure 1:
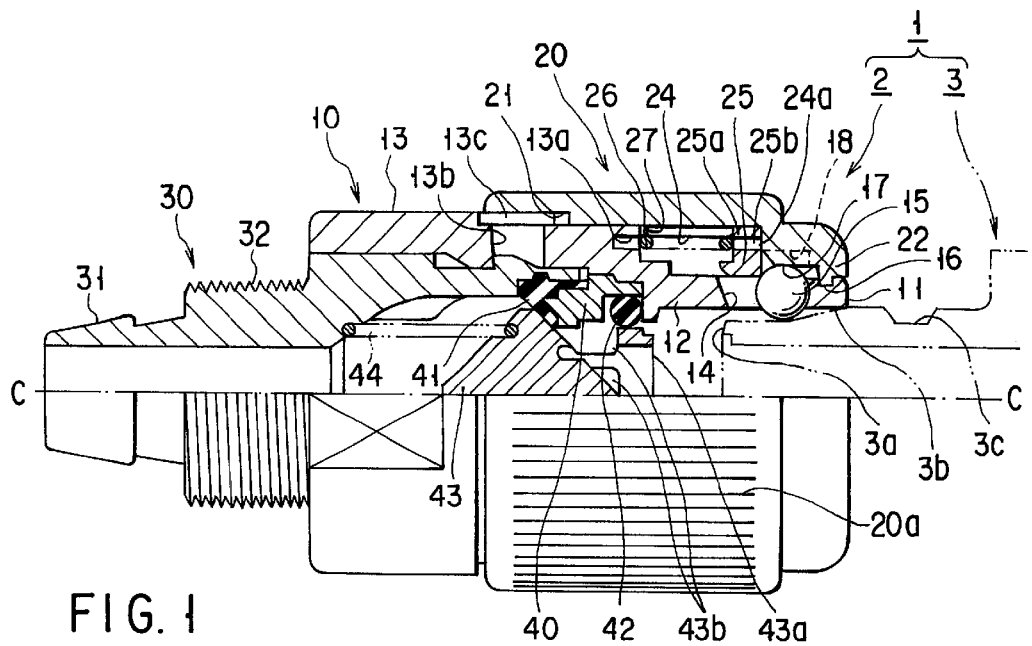
FIG. 1 shows the coupling and is partly a longitudinal sectional view and partly an elevational view.

FIGS. 1 to 8B show a pipe coupling 1 according to the first embodiment of the present invention. At first, FIG. 1 schematically shows the structure of a pipe coupling 1 which comprises a socket 2 and a plug 3 which can be detachably connected with each other. The socket 2 comprises a socket body 10, for example, four lock balls 15, a sleeve 20, and an adapter 30. The socket body 10 has an axial bore for receiving a plug 3 from the front end 11 as an open end. The sleeve 20 can be rotated by a predetermined angle about the coupling axis C—C, in relation to the socket body 10.

The plug 3 has a tapered portion 3b for guiding the lock balls 15 to the circumferential surface of the plug 3, which is near the front end surface 3a of the plug. The plug 3 has an annular groove 3c in the circumferential surface. The groove 3c is located farther from the front end surface than the tapered portion 36. When balls roll into the groove 3c, the slug 3 is locked in the socket 2. This annular groove 3c may be substituted with a plurality of recessed portions arranged at an interval equal to that of the lock balls 15.

The adapter 30 has a rear end portion connected with a pipe (not shown), for example, an urethane hose, and a front end portion connected, through undercut formed thereon, e.g., with an engage hole 13b provided at a rear end portion of a large diameter portion 13 of the socket body 10. Provided at the rear end portion of the adapter 30 are a hose connection portion 31 in which an urethane hose is engaged and connected, and an external screw 32 on which a cap nut (not shown) is screwed. By screwing the cap nut on the external screw 32, the urethane hose fitted on the hose connection portion 31 can be tightened.

Also, a valve mechanism is interposed between the adapter 30 and the socket body 10. This valve mechanism is comprised of the front end portion of the adapter 30, a ring-like packing holder 40, and a valve seat member 41, and the holder 40 and the member 41 are sandwiched between stepped portions at the boundary between the large and small diameter portions 12 and 13 of the socket body 10. An O-ring 42 is provided on the inner circumference of the packing holder 40. Also, a valve member 43 which moves on the pipe coupling axis C—C is provided on the inner circumferential surface of the valve seat member 41. A front portion of the valve member 43 serves as a contact portion 43a, and a plurality of radial holes 43b are provided along the circumferential direction thereof. The front end surface 3a of the plug 3 inserted from the front side along the coupling axis C—C is brought into contact with the contact portion 43a. The entire of this valve member 43 is urged forwardly from behind by a valve spring 44, one end of which is supported by the adapter 30, and is brought into contact with the inner circumferential surface of the valve seat member 41.

In the pipe coupling 1 of the present embodiment, the socket body 10 has a cylindrical shape comprised of a small diameter portion 12 at the front portion and a large diameter portion 13 at the rear portion. At the small diameter portion 12, a plurality of (for example, four) lock ball engage holes 14 are arranged at even intervals in the circumferential direction. Each of the lock ball engage holes 14 is tapered such that the opposed surfaces extending along the axial direction are narrowed radially inwardly. Therefore, a lock ball (lock element) 15 such as a steel ball or the like can freely move in the axial direction and can also be moved out and in with respect to the inner circumferential surface of the small diameter portion 12. That is, each lock ball 15 can move in the radial direction between a locked position where the ball partially projects into the axial bore of the socket body 10 and an unlocked position where the ball is radially outwardly retracted.

The structure in which the lock balls 15 can protrude from, and retract into the inner circumferential surface of the small diameter portion will be explained with reference to FIG. 4, FIG. 6A as a cross-sectional view at the arrow 6A in FIG. 4, FIG. 5, and FIG. 6B as a cross-sectional view at the arrow 6B in FIG. 5.

On the inner circumferential surface of the front end of the sleeve 20, press portions 17 and press release recessed portions 18 are continuously and alternately arranged in the circumferential direction, in the same number as the lock ball engage holes 14 made in one side of the socket body 10. The press portion 17 presses, in the centripetal direction, the lock ball 15 moved to the front end side in the rock ball engage hole 14, and the press release recessed portion 18 serves as a portion which allows the lock ball 15 to escape in the centrifugal direction.

Also, the structure which restricts rotation of the sleeve 20 will be explained with reference to FIG. 4, FIG. 7A as a cross-sectional view at the arrow 7A in FIG. 4, FIG. 5, and FIG. 7B as a cross-sectional view at the arrow 7B in FIG. 5.

The sleeve rotation restricting portion restricts the angle through which the press release recessed portion 18 provided on the inner circumferential surface of the front end of the sleeve 20 can move on the lock ball 15 provided at the side of the socket body 10. FIGS. 7A and 7B show a sleeve rotation restricting mechanism. The mechanism comprises, for example, rotation restricting projecting portions 13c provided at two positions distant from each other by 180°, for example, on the outer circumference of the socket body 10, and arc-like rotation restricting recessed portions 21 provided at two positions distant from each other by 180°, for example, and corresponding to the rotation restricting projecting portions 13c, on the inner circumference of the rear end portion of the sleeve 20. The rotation restricting projecting portions 13c and the rotation restricting recessed portions 21 are engaged with each other. The rotation restricting projecting portions 13c having a length L2 move relatively in the rotation restricting recessed portions 21, so that the sleeve 20 can be rotated by a rotation angle restricted with respect to the socket body 10. That is, the sleeve 20 can move, as shown in FIGS. 4, 6A and 7A between the press positions where the press portions 17 face the lock balls 15 and the release positions where the press release recessed portions 18 face the lock balls 15.

From the rotated positions of the sleeve 20, the sleeve 20 is urged toward the original position by the coil spring 26 described later. That is, the coil spring 26 biases the lock ball 15 such that the press portion 17 presses the lock ball 15 in the centripetal direction.

Further, on the inner surface of the sleeve 20, a large diameter portion 24 is formed to allow the lock ball 15 to escape in the centrifugal direction when the lock ball 15 is moved to the rear end side in the lock ball engage hole 14. Between the large diameter portion 24 and the socket body 10, a space is defined, and a collar member 25 is axially movably received in the space. This collar member 25 is energized by the coil spring 26 toward the front end.

The structure which allows the collar member 25 to move in the inner circumferential side of the sleeve will be explained with reference to FIG. 4, FIG. 8A as a cross-sectional view at the arrow 8A in FIG. 4, FIG. 5, and FIG. 8B as a cross-sectional view at the arrow 8B in FIG. 5.

In the large diameter portion 24 of the sleeve 20, grooves 27 are formed, for example, at two positions distant from each other by 180° on the inner circumferential surface of the portion 24 such that the grooves are elongated in the axial direction. Also, on the outer circumference of the collar member 25, projections 25a are provided at two positions distant from each other by 180° and corresponding to the grooves 27 in the sleeve 20. The projections 25a on the outer circumference of the collar member 25 are slidably engaged in the grooves 27 in the inner circumferential surface of the sleeve, so that the collar member 25 can be slid in the axial direction.

The front end of the grooves 27 at the large diameter portion 24 of the sleeve 20 described above is formed as a stepped portion 24, and the coil spring 26 energizes the collar member 25 toward the stepped portion 24a. Since the collar member 25 exerts the biasing force from behind the lock balls 15, the lock balls 15 are forced toward the advanced position at the front end in the lock ball engage hole 14.

Accordingly, the coil spring described above has one end supported, on a spring engage hole 25b provided in the collar member 25, and another end supported on a spring engage hole 13a provided in the large diameter portion in the socket body 10 side. That is, the lock ball 15 and the collar member 25 one coil spring 26 urges the lock ball 15 and the collar member 25 in the axial direction toward the advanced position at the extreme end. At the same time, the sleeve 20 rotated by a restricted angle about the coupling axis C—C is urged toward the original position in the rotation direction. A ridge 22 projects from the inner circumferential surface of the sleeve 20 and engages with a circumferentially extending groove 16 formed in the outer circumferential surface of the socket body 10. As a result, the sleeve 20 is guided in the circumferential direction in relation to the socket body 20.

As shown in FIG. 1, the sleeve 20 of the first embodiment has a plurality of streak-like grooves, over the entire area of the outer circumference of the sleeve 20, so an operator can easily grips and rotates the sleeve 20.

Next, operation of the pipe coupling according to the first embodiment will be explained with reference to FIGS. 2 to 8B.

Figure 2:
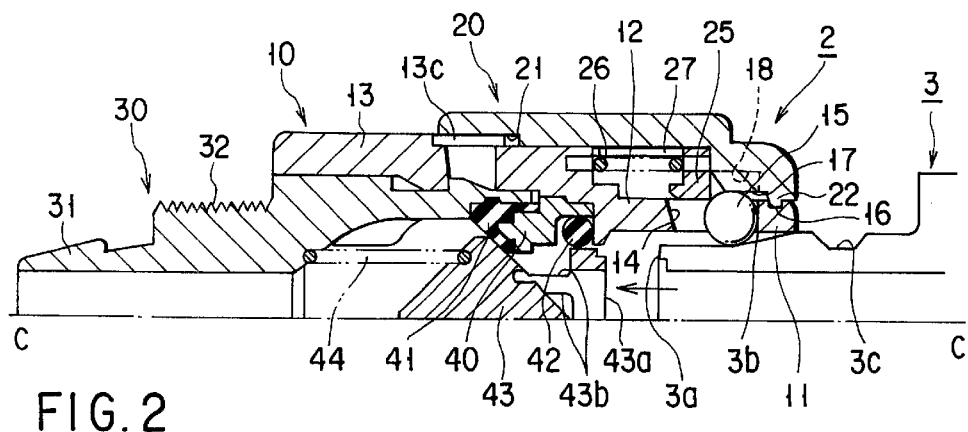
FIG. 2 is a longitudinal cross-sectional view showing a state in the initial stage of insertion/connection of the plug, according to the first embodiment.

At first, as shown in FIG. 2, the plug 3 is inserted from the front end portion 11 of the socket 10. As the plug is inserted, the lock balls 15 are pushed by the tapered portion 3a of the plug 3, and are moved in the lock ball engage holes 14 in the backward direction. Accordingly, the collar member 25 is also moved back in the left direction when viewed in FIG. 2 against the coil spring 26. As the collar member 25 is thus moved back, the lock balls 15 are disengaged from the press portions 17 on the inner circumference of the front end of the sleeve 20 and escape into the large diameter portion 24.

Figure 3:
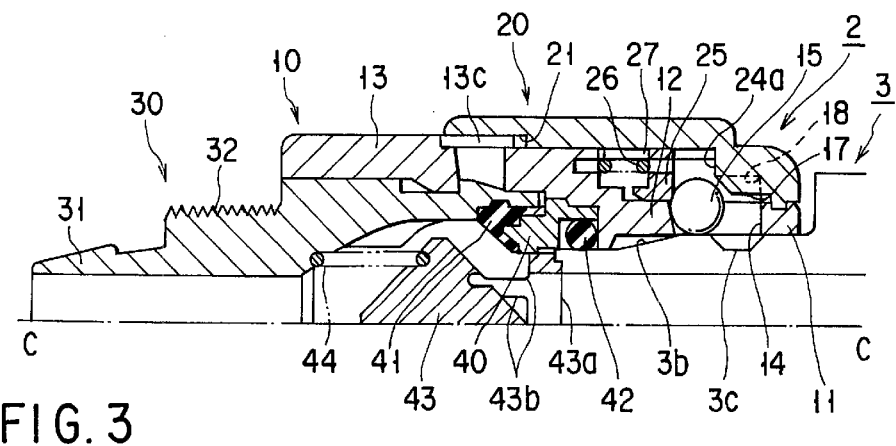
FIG. 3 is a longitudinal cross-sectional view showing a state in the middle stage of insertion/connection of the plug, according to the first embodiment.

As shown in FIG. 3, the plug 3 is further pushed into the socket 2 after the front end surface 3a of the plug 3 is brought into contact with the contact portion 43a. Then, the valve member 43 is moved back against the valve spring 44, thereby creating a clearance between the valve member 43 and the valve seat member 41. Further, upon full insertion of the plug 3, the lock balls 15 fall into the annular groove 3c of the plug 3 thereby locking the plug 3 with respect to the socket 2. Since the lock balls 15 thus fall into the annular groove in the plug side, the lock balls 15 and the collar member 25 both return to the original position at the topmost end portion shown in FIG. 1 due to the elastic force of the coil spring 26. In this locked state shown in FIG. 4, the O-ring 42 is brought into tight contact with the inner circumferential surface of the packing holder 40 and the outer circumferential surface of the plug 3. The urethane hoses in both the plug 3 side and the adapter 30 side can communicate with each other through the communication hole 43b.

Figure 4:
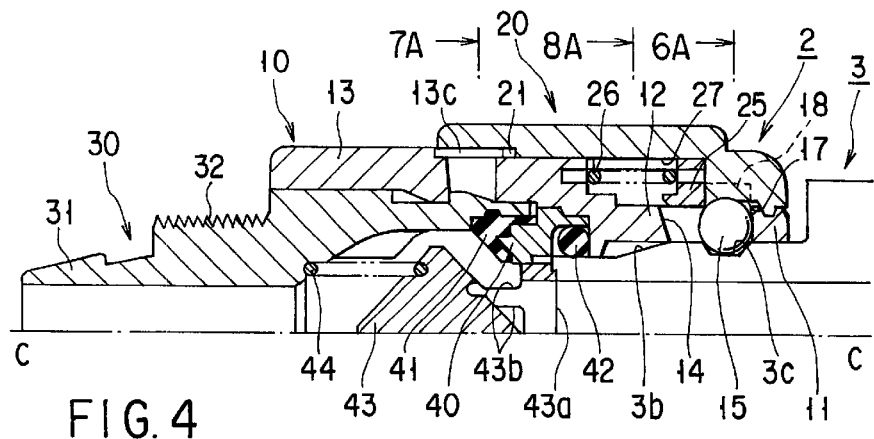
FIG. 4 is a longitudinal cross-sectional view showing a locked state of the inserted and connected plug by means of lock balls in the first embodiment.
Figure 5:
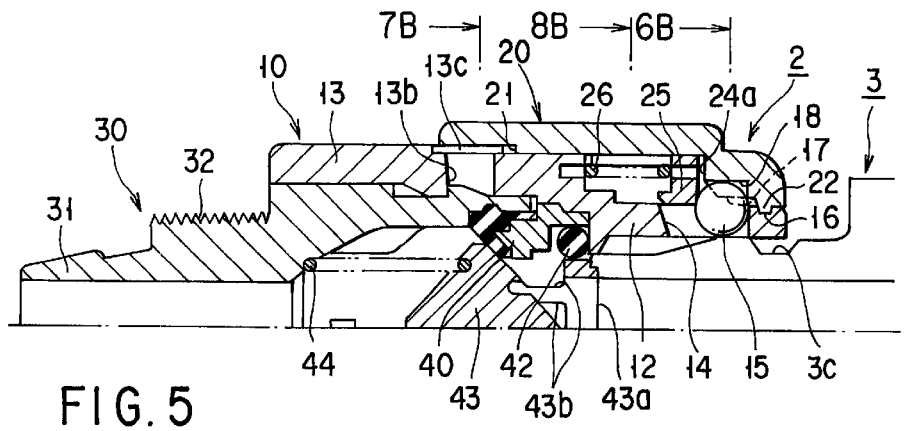
FIG. 5 is a longitudinal cross-sectional view showing a state where lock of the plug is released by sleeve rotation operation in the first embodiment.
Figures 6A, 6B:
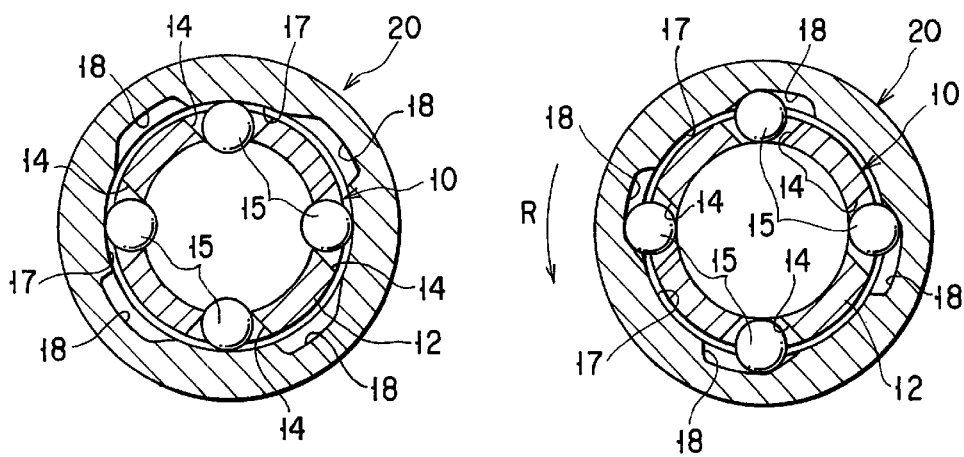
FIGS. 6A and 6B are respectively a longitudinal cross-sectional view, taken along line 6A in FIG. 4 showing a locked state and a longitudinal cross-sectional view, taken along line 6B in FIG. 5 showing an unlocked state.

In FIG. 4 and FIG. 6A showing the locked state, the lock balls 15 in the lock ball engage holes 14 are disengaged from the press release recessed portions 18 in the inner circumferential surface of the sleeve 20, and are pressed by the press portions 17, so that the balls are prevented from projecting and moving in the centrifugal direction. Also, in this locked state, as shown in FIG. 7A, the rotation restricting projecting portions 13c in the socket body 10 side are kept stopped at predetermined positions in the rotation restricting recessed portions 21.

In order to disconnect the plug 3 from the socket 2, the sleeve 20 is gripped and rotated in the direction of the arrow R as shown in FIG. 6B. As the sleeve 20 rotates, the positions of the press release recessed portions 18 in the inner circumferential surface of the sleeve are displaced and aligned with the positions of the lock balls 15 which have fallen into the annular groove 3c in the plug 3 side. The lock balls 15, which have been pressed by the press portions 17 on the inner circumferential surface of the sleeve and have been prevented from moving in the centrifugal direction, are drawn into the press release recessed portions 18. (See FIG. 5.)

At the same time, as shown in FIG. 7B, by the rotation of the sleeve 20 in the direction of the arrow R, the rotation restricting recessed portions 21 of the sleeve 20 move relative to the rotation restricting projecting portions 13c in the socket body 10 over the distance range of the length L1.

As shown in FIGS. 6B and 7B, the lock balls 15 are rendered movable in the centrifugal direction and are drawn into the press release recessed portions 18. The valve member 43 then receives the biasing force of the spring 44 from the back side and moves forward, thereby pushing back the plug 3 in contact with the contact portion 43a, in the right direction when viewed in the drawings. Due to the backward movement of the plug 3, the lock balls 15 in the annular groove 3c fully enter into the press release recessed portions 18 and are retracted into the inner circumferential surface of the small diameter portion 12. The plug 3 disengaged from the lock balls 15 can then be disconnected from the front end portion 11 of the socket 10.

As described above, in the pipe coupling 1 according to the first embodiment, connection is done only by pushing in the plug 3 without rotating the sleeve 20. When disconnecting the plug 3, the plug 3 can be disconnected only by rotating the sleeve 20 in a predetermined direction.

FIGS. 9A to 11B show the second embodiment. Those members and portions that are common to the first embodiment shown in FIGS. 1 to 8B will be denoted at common reference symbols.

The second embodiment substantially relates to a structure in which the sleeve 20 is operated by a combination of proper drawing operation and rotation operation described above, thereby to prevent unexpected rotation of the sleeve.

Figure 9A:
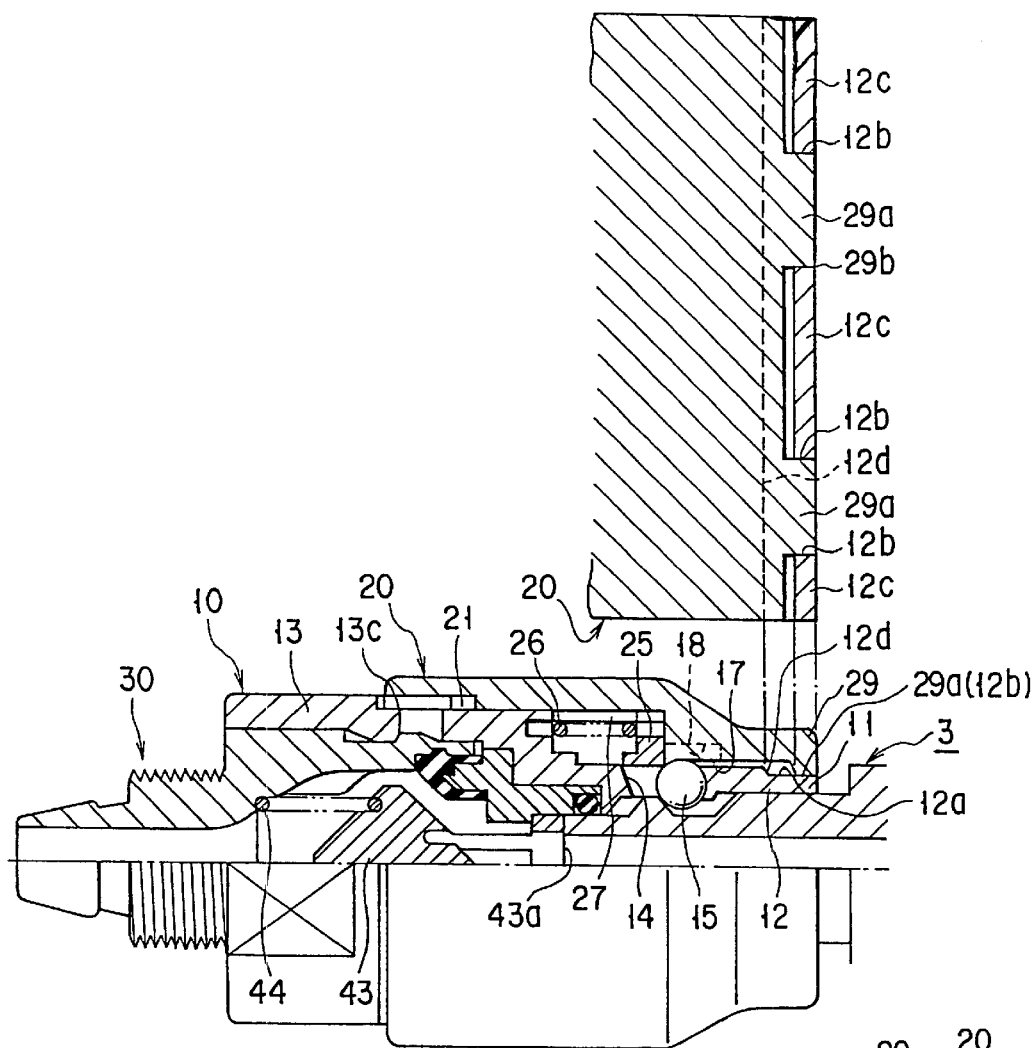
FIGS. 9A and 9B are respectively a longitudinal cross-sectional view showing a connecting state of the socket body and the plug a part of which is schematically extended, and a transverse cross-sectional view of the extended part, in a pipe coupling according to the second embodiment of the present invention.
Figure 9B:
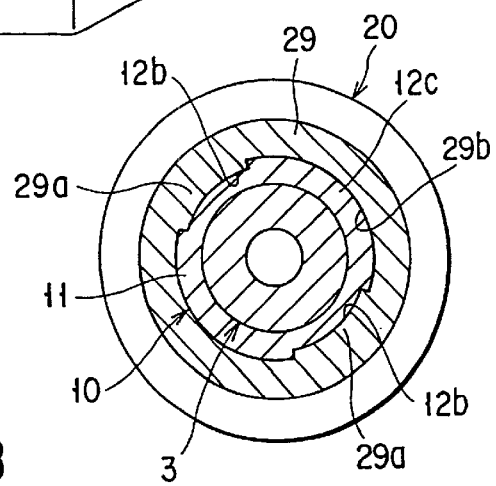

As shown by the connected state shown in FIGS. 9A and 9B, the socket body 10 and the sleeve 20 are arranged in a recessed and projecting structure in which the inner circumference of the front end portion 11 of the body 10 and the outer circumference of the front end portion 29 of the sleeve 20 can be engaged with each other, thereby to prevent rotation in the initial stage of the operation. That is, as partially shown in the schematic extended view of FIG. 9A, on the outer circumferential surface of the front end portion 11 of the socket body 10 and the inner circumferential surface of the front end portion 29 of the sleeve 20, for example, rotation-stop recessed portions 12b and rotation-stop projecting portions 12c are provided at proper positions along the outer circumferential surface of the front end portion 11 of the socket body 10. A recessed portion 12a for allowing rotation is provided on the entire circumference of the part up to a pulling restricting stepped portion 12d, except for the rotation-stop recessed portions 12c. In the sleeve 20 in the other side corresponding thereto, rotation-stop projecting portions 29a corresponding in number to the rotation-stop recessed portions 12b are provided at positions corresponding to the recessed portions 12b. Pulling operation of the rotation-stop projecting portions 29a along the axial direction is restricted by the stepped portion 12d in the socket body 10. This stepped portion 12d circumferentially guides the projecting portion 29a in the recessed portion 12a.

However, the depth of each of the rotation-stop recessed and projecting portions, i.e., the axially slidable size is set to an appropriate minimum length which does not interfere operations even if there are limitations from the installation space and the work space. That is, the recess-projecting engagement is released by slightly pulling the sleeve 20, so that sleeve rotation in the second step is enabled.

Next, explanation will be made of the operation and function of the pipe coupling according to the second embodiment described above. The structure associated with the rotation operation of the sleeve 20 in the second step is the same as that of the first embodiment, and explanation thereof will be omitted herefrom.

As shown in FIGS. 9A and 9B, in a plug-connected state where the coupling is locked, the rotation-stop recessed and projecting portions 12b and 12c of the front end portion 11 of the socket body 10 are respectively engaged with the rotation-stop recessed and projecting portions 29b, and the projecting portions 29a of the front end portion 29 of the sleeve 20.

Figure 10A:
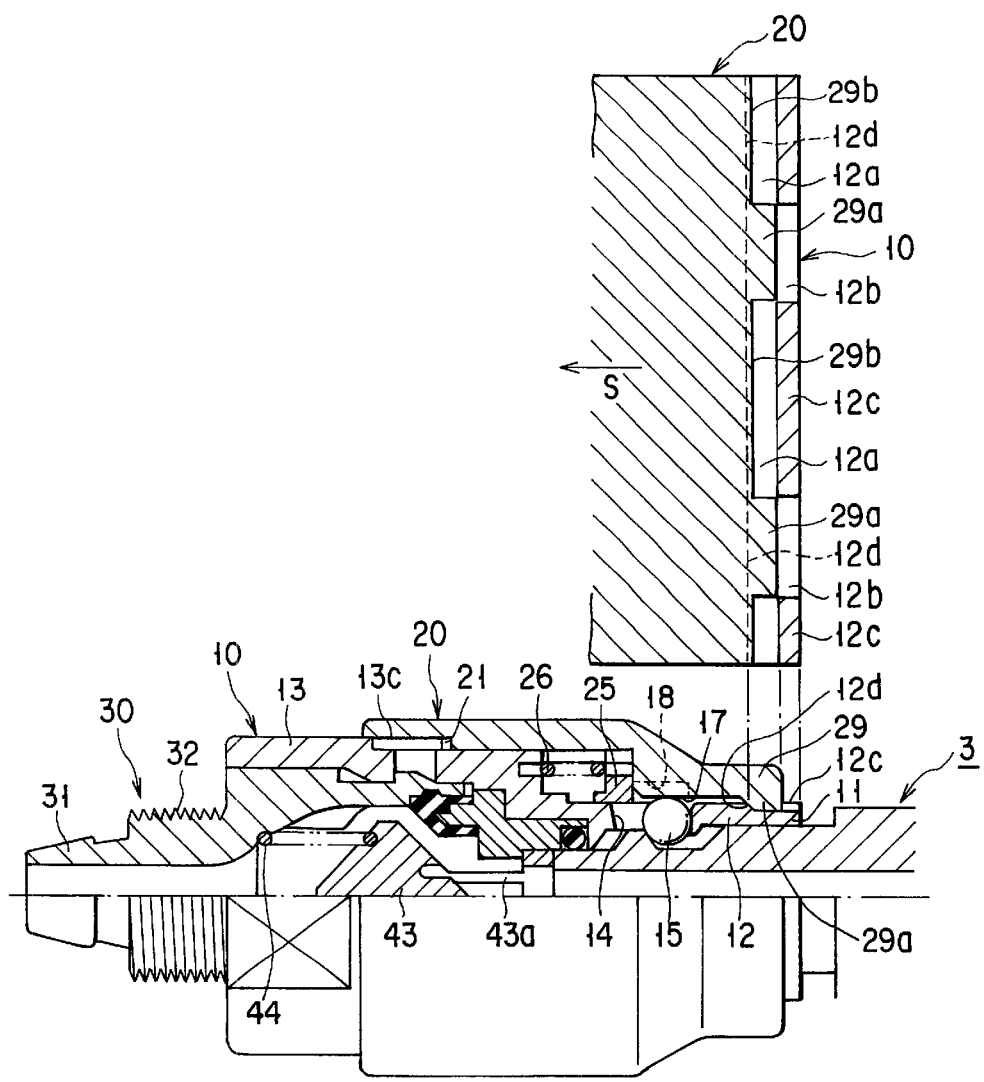
FIGS. 10A and 10B are respectively a longitudinal cross-sectional view showing a pulling operation state in a first step when plug separation operation is carried out, with a part schematically extended, and a transverse cross-sectional view of the extended part, in the pipe coupling according to the second embodiment of the present invention.
Figure 10B:
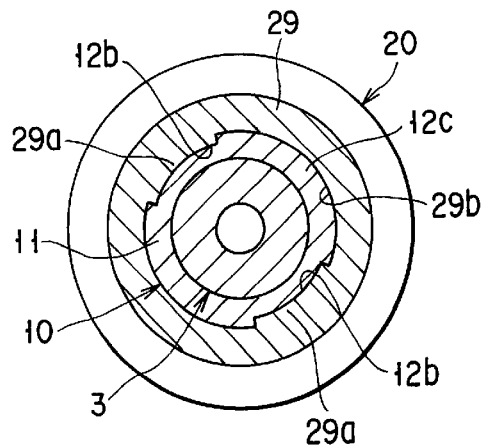

To disconnect the plug 3 set in the located state, as shown in FIG. 10A, the sleeve 20 is slightly drawn back in the direction of the arrow S, in the first step. Then, the rotation-stop projecting portion 29a in the sleeve 20, which has been engaged with the rotation-stop recessed portion 12b between adjacent rotation-stop portions 12c in the socket body 10, moves off therefrom.

Figure 11A:
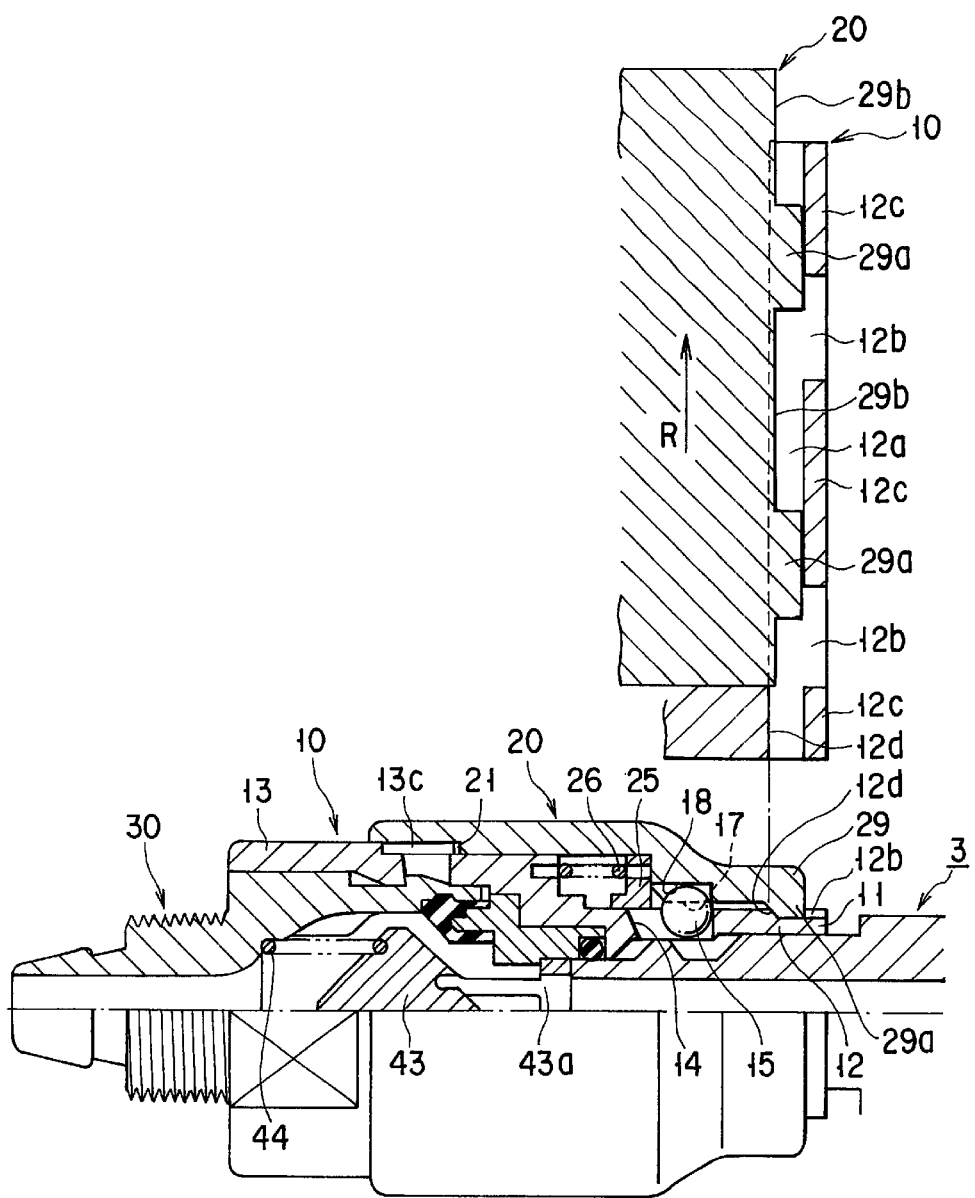
FIGS. 11A and 11B are respectively a longitudinal cross-sectional view showing a pulling operation state in a second step when plug separation operation is carried out, with a part schematically extended, and a transverse cross-sectional view of the extended part, in the pipe coupling according to the second embodiment of the present invention.
Figure 11B:
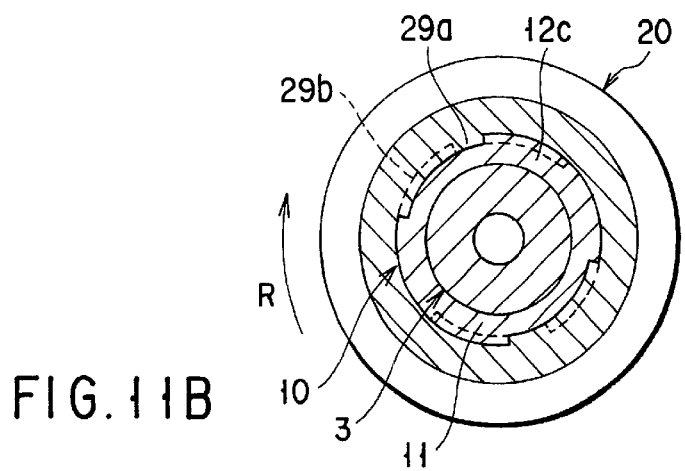

In a subsequent second step, as shown in FIG. 11A, the sleeve 20 is rotated in the direction of the arrow R with the sleeve 20 kept pulling back. The rotation angle is within the restricted distance as indicated in the first embodiment. Through both of the pulling operation and rotating operation of the sleeve 20, the rotation-stop projecting portions 29a of the sleeve 20 are rotated in the recessed portions 12a in the socket body 10, so as to rotate around the rotation-stop projecting portions 12c to the back side thereof.

By the sleeve rotating operation in this second step, the plug 3 is disconnected in an operation procedure like in the first embodiment. As is apparent from the above, the sleeve 20 cannot be rotated as long as pulling operation of the sleeve 20 is not carried out in the first step. As a result, unexpected fall-off of the plug 3 can be prevented beforehand.

Figure 12A:
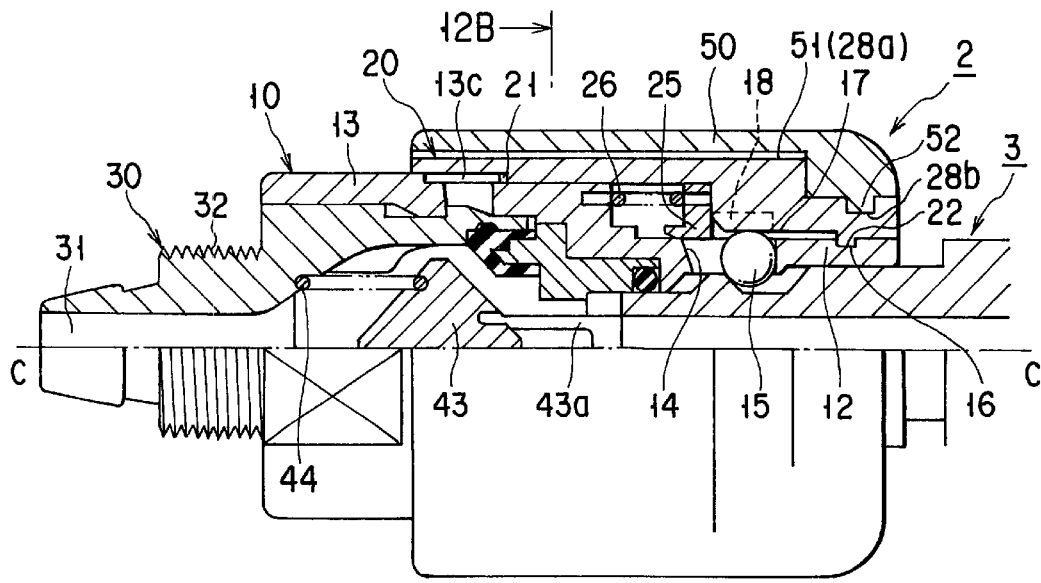
FIGS. 12A and 12B are respectively a partially sectioned side view showing a connecting state of the socket body and the plug, and a longitudinal cross-sectional view showing a clearance between the protection cylinder and the sleeve as main parts thereof.
Figure 12B:
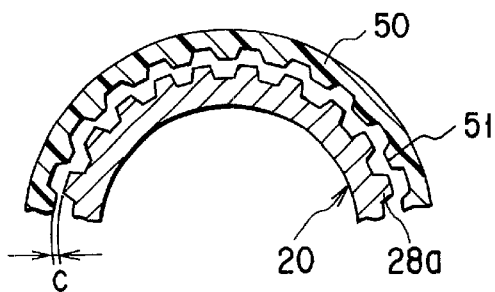

Next, FIGS. 12A and 12B show a pipe coupling according to the third embodiment of the present invention. Those members and portions that are common to the first and second embodiments are denoted at common references.

The pipe coupling according to the third embodiment adopts a structure in which the entire sleeve 20 is covered with a protection cylinder 50 as a safety cover, in place of the pulling operation structure of the sleeve 20 according to the second embodiment.

As shown in FIG. 12A and FIG. 12B which is a longitudinal cross-section as viewed in the direction of the arrow 12B shown in FIG. 12A, a plurality of grooves in the axial direction or engage teeth 51 are formed at an equal interval along the inner circumference of the protection cylinder 50. Engage teeth 28a which can be engaged with the engage teeth 51 of the inner circumference of the protection cylinder 50 and have the shape as the engage teeth 51 are formed around the outer circumference of the sleeve 20. Both of the engage teeth 51 and 28a are arranged in a dimensional relationship which creates a clearance between tooth tops opposing each other, so that the teeth 51 and 28a do not bite each other in an ordinary state.

Meanwhile, an annular ridge 52 is provided on the inner circumferential surface of the front end portion of the protection cylinder 50 and is engaged in the ring-like concave groove 28b provided in the outer circumferential surface of the front end portion of the sleeve 20. This annular ridge 52 is engaged with the ring-like concave groove 28b and is thereby guided so that the safety cover 50 can idly rotate relatively on the sleeve 20 with the clearance c maintained.

According to the structure described above, to disconnect the plug 3 set in the locked and connected state as shown in FIG. 12A, the operator firstly grips and holds firmly the protection cylinder 50. Due to the grip force, the protection cylinder 50 is elastically deformed in the direction in which the diameter is reduced, and the engage teeth 51 on the inner circumference is engaged with the engage teeth 28a on the outer circumference of the sleeve 20.

Next, the protection cylinder 50 is rotated in a predetermined direction with this cylinder engaged with the sleeve 20. The sleeve 20 in the inner side rotates by a restricted angle in the direction of the arrow R indicated in the above first and second embodiments. The plug 3 can be then separated by the rotating operation of the sleeve 20, through a series of operation procedure described above.

Figure 13:
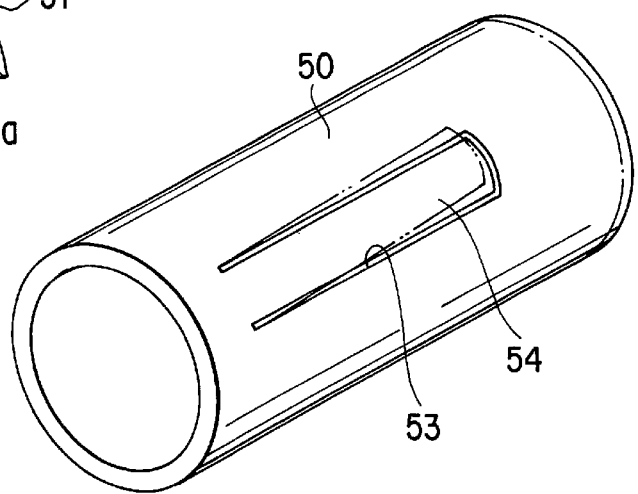
FIG. 13 is a perspective view showing only a modification example of the protection cylinder in the pipe coupling according to the third embodiment.

FIG. 13 is a perspective view showing a modification example of the protection cylinder 50 according to the third embodiment. In this case, a slit is formed at at least one portion on the protection cylinder, or preferably, slits are formed at several portions in the outer circumferential direction. The part surrounded by the slit 53 is arranged as a tongue piece 54 which can be elastically bent. In this case, the engage teeth 51 and 28a may be respectively provided on the inner circumferential surface of the tongue piece 54 and the outer circumferential surface of the sleeve 20. Otherwise, in place of the teeth, recessed portions may be provided on one of the tongue piece 54 and the sleeve 20, and projecting portions may be provided on the other.

Accordingly, by gripping and pushing in the tongue piece 54 of the protection cylinder 50, the protection cylinder 50 and the sleeve 20 are integrally rotated and operated together within the restricted angle range as described above, with the tongue piece engaged with the outer circumferential surface of the sleeve 20 in the inner side by means of recessed and projecting portions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pipe coupling including a socket and a plug which respectively have front end portions which can be engaged with each other, as well as rear end portions connected with pipes, wherein the socket comprises a socket body having an open end where an axial bore for receiving the plug is opened, at least one lock ball which can be moved between a lock position where the lock ball partially projects into the axial bore and an unlock position where the lock ball is retracted thereby making the plug movable in the axial-direction, and a sleeve slidably mounted on the socket body and capable of holding the lock ball at the lock position;

the plug has a groove in which the lock ball can be engaged, the socket body has a front end portion adjacent to the open end, and a lock ball engage hole which is formed at the front end portion, receives the lock ball movably in an axial direction and a radial direction, can retract the ball from the lock position where the lock ball partially projects into the axial bore, and is elongated in the axial direction, the sleeve is mounted on the outer circumference of the socket body to be rotatable about an axis thereof, and has an inner circumferential surface, a press portion which is formed on the inner circumferential surface and presses the lock ball located at a position close to the open end in the lock ball engage hole toward the lock position, a press release recessed portion capable of retracting the lock ball to the unlock position, and a large diameter portion arranged axially adjacent to the press portion and the press release recessed portion and capable of retracting the lock ball located at a position distant from the open end to the unlock position, the pipe coupling further comprises a sleeve rotation restricting mechanism for restricting a rotation range of the sleeve to an angular range between a press position where the press portion opposes the lock ball and a press release position where the press release recessed portion opposes to the lock ball, a collar movably contained in the large diameter portion, and a spring for urging the sleeve toward the press position and for urging the collar toward the open end, and one of the socket body and the sleeve comprises at least one projecting portion, and another one comprises a first recessed portion capable of receiving the projecting portion along an axial direction and a second recessed portion communicating with the first recessed portion, wherein the socket body and the sleeve are stopped so as to prevent relative movement in a circumferential direction against the spring urging in the circumferential direction and an axial direction when the projecting portion is engaged with the first recessed portion, and movement in an axial direction between said socket body and the sleeve standing against the spring urging in the axial direction is disabled and relative rotation standing against the spring urging in the circumferential direction is allowed when the projecting portion is contained in the second recessed portion.

2. A pipe coupling according to claim 1, wherein the sleeve rotation restricting mechanism has a rotation restricting recessed portion circumferentially extended on one of the outer circumference of the socket body and the inner circumferential surface of the sleeve, and a rotation restricting projecting portion formed on another one, having a length shorter in a circumferential direction than that of the rotation restricting recessed portion, and projecting into the rotation restricting recessed portion.

3. A pipe coupling according to claim 2, wherein the rotation restricting recessed portion and the rotation restricting projecting portion are paired and provided at positions distant from each other by 180° in the circumferential direction.

4. A pipe coupling according to claim 1, wherein the collar and the sleeve have at least one groove formed in one of the collar and the sleeve, as well as a projection formed on the other of the collar and the sleeve, the projection being slidable in the groove only in the axial direction, and the spring is contained in the large diameter portion and has a coil-like shape having an end engaged on the socket body and another end engaged on the collar.

5. A pipe coupling according to claim 4, wherein the sleeve has a pair of grooves opposing to each other and extending in a lengthwise direction, and the collar has a pair of projections slidable along the grooves in the axial direction.

6. A pipe coupling according to claim 1, comprising a plurality of projecting portions provided on one of the socket body and the sleeve, and a plurality of recessed portions provided on the other of the socket body and the sleeve and capable of receiving the projecting portions along the axial direction, wherein relative rotation between the socket body and the sleeve is prevented when the plurality of projecting portions are engaged with the plurality of recessed portions, and the relative rotation is allowed when the plurality of projecting portions are contained in a circumferential recessed portion.

7. A pipe coupling according to claim 6, wherein the circumferential recessed portion has a stepped portion to guide the plurality of projecting portions at a side apart from the plurality of recessed portions.

8. A pipe coupling according to claim 1, wherein the socket has a valve member which closes the axial bore, and the valve member opens the axial bore when the plug is inserted.

9. A socket having a rear end portion connected with an end portion of a pipe, and a front end portion which can be freely attached to and detached from a plug having a lock ball engage groove, comprising:

a socket body having an open end where an axial bore for receiving the plug is opened;

at least one lock ball which can be moved between a lock position where the lock ball partially projects into the axial bore and an unlock position where the lock ball is retracted, thereby making the plug movable in the axial-direction; and a sleeve slidably mounted on the socket body and capable of holding the lock ball at the lock position, wherein the socket body has a front end portion adjacent to the open end, and a lock ball engage hole which is formed at the front end portion, receives the lock ball movably in an axial direction and a radial direction, can be drawn from the lock position where the lock ball partially projects into the axial bore, and is elongated in the axial direction, the sleeve is mounted on the outer circumference of the socket body to be rotatable about an axis thereof, and has an inner circumferential surface, a press portion which is formed on the inner circumferential surface and presses the lock ball located at a position close to the open end in the lock ball engage hole toward the lock position, a press release recessed portion capable of retracting the lock ball to the unlock position, and a large diameter portion arranged axially adjacent to the press portion and the press release recessed portion in the axial direction and capable of retracting the lock ball arranged at a position distant from the open end to the unlock position, the socket further comprises a sleeve rotation restricting mechanism for restricting a rotation of the sleeve to an angular range between a press position where the press portion opposes to the lock ball and a press release position where the press release recessed portion opposes to the lock ball, a collar movably contained in the large diameter portion, and a spring for urging the sleeve toward the press position and for urging the collar toward the open end, and one of the socket body and the sleeve comprises at least one projecting portion, and another one comprises a first recessed portion capable of receiving the projecting portion along an axial direction and a second recessed portion communicating with the first recessed portion, wherein the socket body and the sleeve are stopped so as to prevent relative movement in a circumferential direction against the spring urging in the circumferential direction and an axial direction when the projecting portion is engaged with the first recessed portion, and movement in an axial direction between said socket body and the sleeve standing against the spring urging in the axial direction is disabled and relative rotation standing against the spring urging in the circumferential direction is allowed when the projecting portion is contained in the second recessed portion.

* * * * *